United States Patent [19]

Bell et al.

[11] Patent Number: 4,680,770
[45] Date of Patent: Jul. 14, 1987

[54] DUAL BEAM GAS ION LASER

[75] Inventors: William E. Bell, Jerome, Ariz.; George J. Collins, Fort Collins, Colo.

[73] Assignee: Lasertechnics, Inc., Albuquerque, N. Mex.

[21] Appl. No.: 821,156

[22] Filed: Jan. 21, 1986

[51] Int. Cl.$^4$ .............................................. H01S 3/08
[52] U.S. Cl. .................................... 372/99; 372/103; 372/88; 372/87; 372/92; 372/85
[58] Field of Search ................... 372/87, 76, 103, 85, 372/92, 98, 86, 34, 74, 23, 58, 99, 88, 55

Primary Examiner—Leon Scott, Jr.

[57] ABSTRACT

A gas ion laser employs two or more independently controlled electrical gas discharges including a longitudinal plasma arc created by a thermionic cathode and an anode and a transverse glow discharge electron beam created within a photocathode reflector. These separately controlled gas discharges are arranged in a unique topology that produces highly excited atomic ions on the optical axis of a laser cavity, giving rise to a beam of laser optical radiation characteristic of the gas ion species being excited. The longitudinal plasma arc on the optical axis is heavily populated with ground state thermal ions that are not sufficiently excited to the energetic states required for laser action. The additional energy to excite these ground state thermal ions to the upper laser states is provided by a second more energetic photo-electron and glow discharge electron beam generated by a negatively biased coaxial photocathode reflector.

40 Claims, 6 Drawing Figures

ARGON ION LASER ENERGY LEVELS
FIG. 1.

DUAL BEAM GAS ION LASER

BACKGROUND OF THE INVENTION

This invention relates generally to lasers and more specifically to an apparatus for efficiently producing laser action from highly excited atomic ions throughout the visible, ultraviolet and vacuum ultraviolet regions of the light spectrum.

With the exception of the helium-neon gas laser, virtually all of the important visible and ultraviolet continuous-wave gas laser wavelengths belong to the spectra of ionized atoms. See, for example, U.S. Pat. No. 3,464,025. The design and construction of long lived reliable gas ion laser tubes has taxed the ingenuity of many inventors, scientists and engineers. The containment in a small capillary tube discharge of the extremely hot electrified gas needed to obtain laser action pushes the stability of known refractory laser tube materials to the limit. Two basic gas ion laser tube topologies became commercially available when fluid cooled fused silica capillary tube discharges were found to be very short lived. One type of gas ion laser tube described in U.S. Pat. No. 3,619,810 uses a stack of coaxially aligned graphite segments contained within a gas-tight glass tube. Another type of gas ion laser tube described in U.S. Pat. No. 3,760,213 employs a thick-walled high thermal conductivity ceramic capillary tube discharge in direct contact with the fluid coolant. The preferred embodiment uses beryllium oxide ceramic bore segments bonded together to provide the desired discharge length.

An improved type of gas ion laser described in U.S. Pat. Nos. 4,378,600 and 4,376,328 overcomes some of the limitations of the two prior art designs discussed above. The discharge tube taught in these two references is composed of refractory discs bonded to a ductile high thermal conductivity material, which in turn is bonded to a fluid cooled hermetically sealed insulating tube. A preferred embodiment uses carefully aligned refractory metal disc apertures brazed to copper discs which are in turn brazed at their outer circumferences to a gas-tight alumina tube with exterior fluid cooling.

Another improved type of gas ion laser described in U.S. Pat. No. 3,931,589 employs, as a source of electrons, a hollow cathode discharge centered coaxially about the optical axis.

The prior art gas ion lasers described in the references cited above are not very efficient, with only a small fraction (typically 0.01) of a percent of the electrical discharge energy appearing as laser output. A number of investigators have studied alternative excitation schemes in an attempt to improve the basic efficiency of this class of ion lasers, but to date the aperture-enhanced high current density plasma tubes have prevailed.

Figure 1:
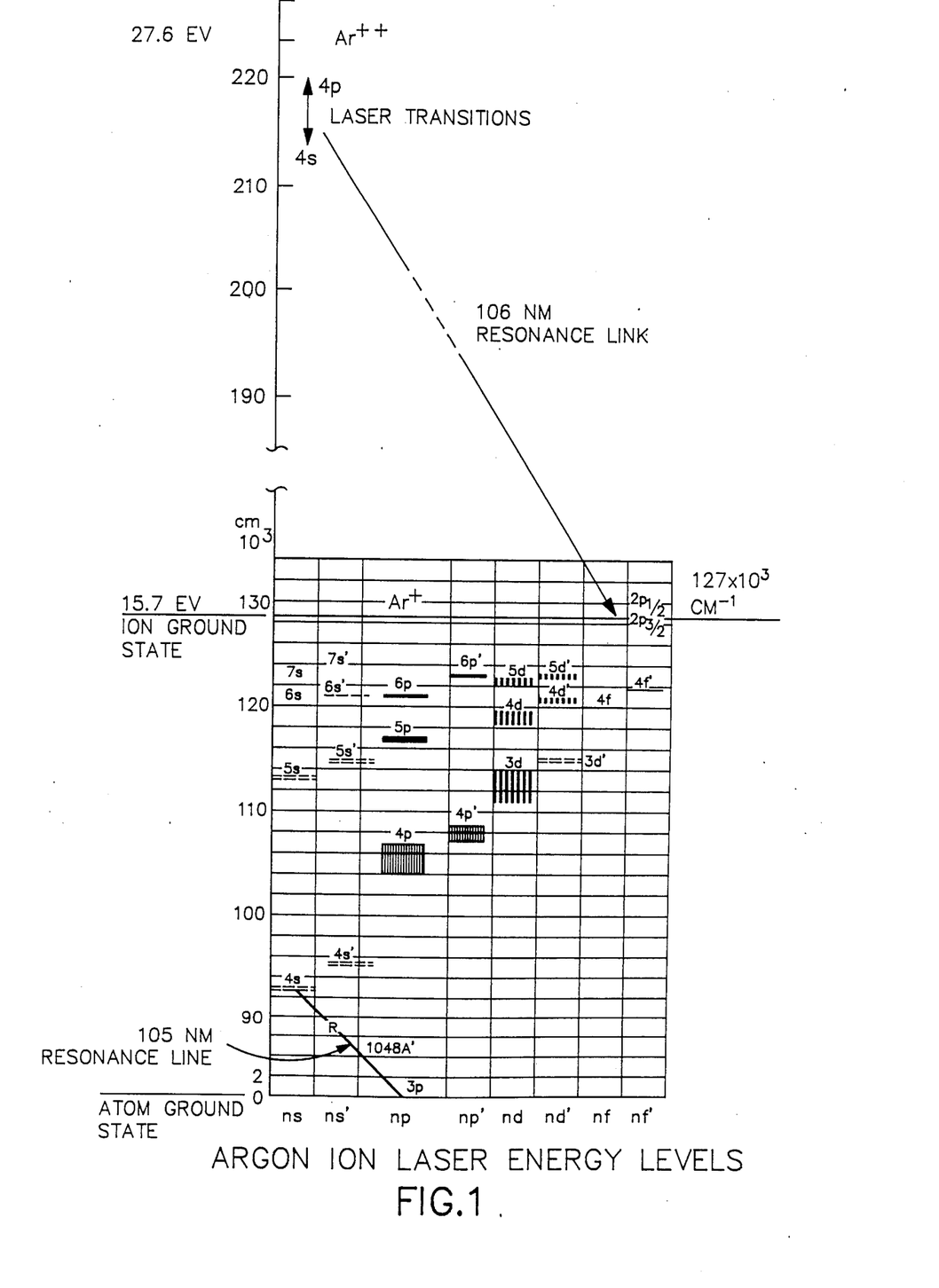
FIG. 1 is a partial energy level diagram of neutral, singly, and doubly ionized argon showing the upper laser levels of singly ionized argon.

An analysis of the laser inversion mechanism for the singly ionized argon gas ion can be illustrated by referring to the generalized energy level diagram of FIG. 1. Alternative populating mechanisms are possible depending on discharge conditions and choice of ion species.

Figure 1A:
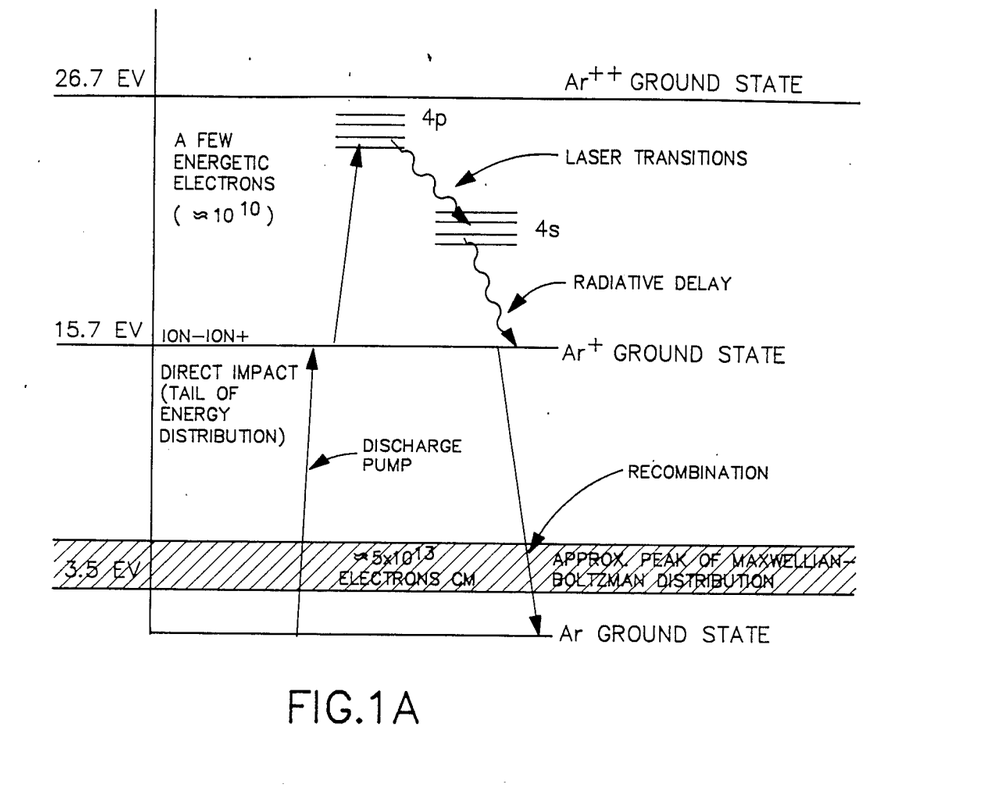
FIG. 1A illustrates the electron density versus electron energy in conventional capillary tube discharges corresponding to the argon energy levels located in the three energy regions: 3–5 eV, 15.7 eV, and 27.6 eV.

Examination of the energy levels shown in FIG. 1 indicates that electron energy levels well in excess of 20 electron volts are required to populate the upper laser states starting from the ground state of neutral argon. For current densities less than 100 amperes per square centimeter of beam cross section the peak of the Maxwellian-Boltzman energy distribution is approximately 3–5 electron volts, as shown in the shaded portion of FIG. 1A.

Figure 2:
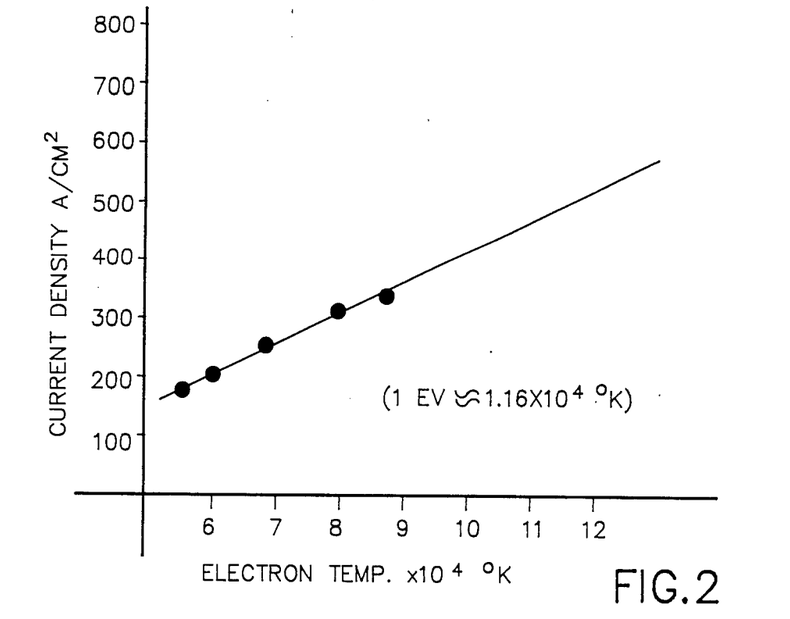
FIG. 2 is a plot of the variation of the electron temperature in conventional capillary tube discharges as a function of current density.
Figure 3:
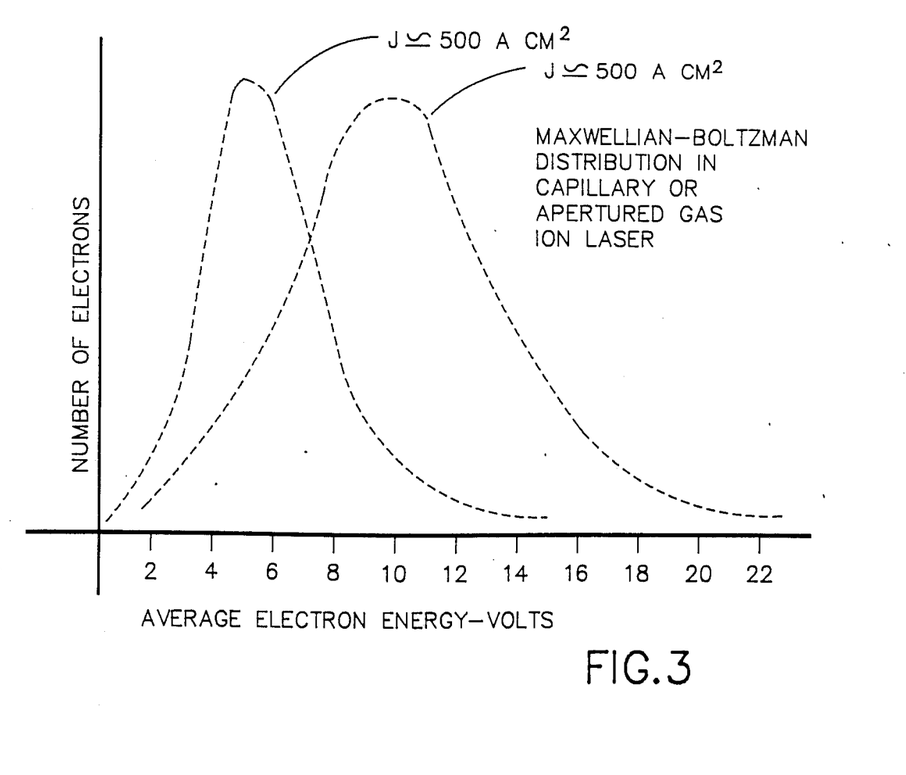
FIG. 3 is a plot of electron energy distribution in conventional capillary tube discharges at current densities of 100 and 500 amperes per square centimeter.

At higher current densities the electron temperature will increase as shown in FIG. 2, giving rise to a small increase in energetic electrons on the tail of the electron population distribution as shown in FIG. 3. It is clear that impractically large current densities would be required to appreciably increase the number of energetic electrons in a low pressure gas discharge at the energy of 20 electron volts. Thus, a practical upper limit is set on the laser output power and generation efficiency obtainable from capillary or apertured gas ion laser plasma tubes, this upper limit being typically $10^{-2}$ percent.

In summary, conventional gas ion lasers have a fundamental deficiency. Although the high current density provides ample charged particles, conventional gas ion lasers lack the energetic electrons required for efficient pumping of the upper laser states.

SUMMARY OF THE INVENTION

The present invention is directed to a gas ion laser that employes two or more independently controlled electrical gas discharges: one, a longitudinal plasma arc and the second, a transverse glow discharge electron beam. These separately controlled gas discharges are arranged in a unique topology that produces highly excited atomic ions on the optical axis of a laser cavity, giving rise to a beam of laser optical radiation characteristic of the gas ion species being excited. The longitudinal plasma arc on the optical axis is heavily populated with ground state thermal ions that are not sufficiently excited to the energetic states required for laser action. The additional energy to excite these ground state thermal ions, as well as the more numerous neutral ground states, to the upper laser states is provided by a second more energetic photo-electron and glow discharge electron beam generated by a negatively biased coaxial photocathode reflector. The photocathode reflector has a surface treatment designed to optimize the production of photo-electrons generated by photons from the on-axis plasma arc. This is in contrast to prior art glow discharge electron beams which use primarily ion bombardment of the cathode surface as the source of secondary electron emission. See, for example, U.S. Pat. No. 3,482,133 (Dugdale) and British Patent Serial No. 1514356 (Holliday). Concurrent with the generation of photo-electrons will be secondary electrons obtained by ion bombardment of the photocathode reflector because of the negative electrical bias applied. Both the photo-electrons and secondary electrons, from the photocathode reflector, are focused by both the cathode geometry and associated electrical field lines in the glow discharge plasma sheath to interact with the dense low energy longitudinal plasma arc on the optical axis. The reaction region where the two discharges intersect provides a medium for efficient population of the upper laser states of singly and multiply ionized species. Initially, the photo-electron production from the photocathode reflector will be generated by the photon line source of the longitudinal plasma arc, which consists predominantly of the 105 nanometers (nm) vacuum ultraviolet resonance line of the thermal argon atoms and the 106 nm vacuum ultraviolet resonance line of the argon ion. Note, however, that the additional energy from focused photocathode reflector electrons generates excited ions which in turn produce additional vacuum ultraviolet photons at 106 nanometers. Thus, shortly after the discharges are initiated, a compounding action takes place at the focus of the photocathode reflector which will increase the gas temperature and excitation significantly. Moreover, by relying less on ions for secondary electron production, we reduce the undesired cathode sputtering associated with ion bombardment of the photo-electron cathode. Proper adjustment of the separate beam parameters provides a substantial improvement in operating efficiency, selective excitation of upper laser levels, and production of multiply ionized states for visible, ultraviolet, and shorter wavelength generation. The gas ion laser of the present invention no longer requires materials or structures compatible with high current density operation. Thus, one can design plasma tubes having large optical apertures and substantial volumes of excited gas ions suitable for laser action having a simpler geometry, lower cost, and higher reliability structure.

DESCRIPTION OF THE ILLUSTRATED EMBODIMENT OF THE INVENTION

Figure 4:
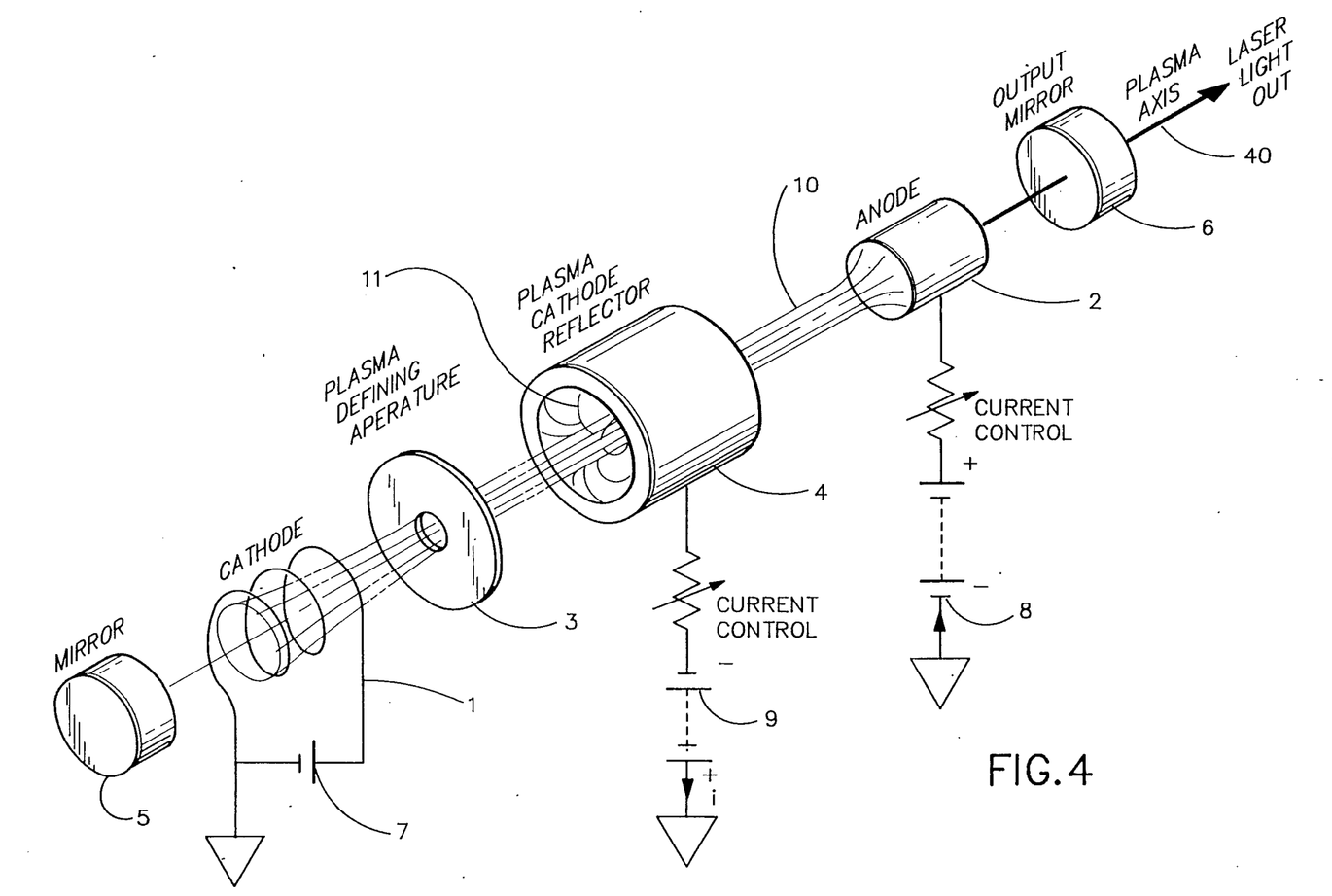
FIG. 4 is a pictorial representation of a gas ion laser constructed in accordance with the present invention.

Referring now to FIG. 4, there is shown a pictorial representation of a gas ion laser constructed in accordance with the teachings of the present invention. This gas ion laser employs a neutral longitudinal plasma arc 10 and a transverse glow discharge electron beam 11 created in a photocathode reflector 4. A thermionic cathode 1 is provided that is capable of generating substantial electron currents when resistively heated via power source 7 to proper operating temperatures. An anode electron collector 2 is electrically biased by controlled power source 8 to create the longitudinal plasma arc 10. Power source 8 may be either a D.C. source or an A.C. source. A plasma defining aperature 3 serves to define the axis of the longitudinal plasma arc 10 between cathode 1 and anode 2. The photocathode reflector 4 has a selected internal surface treatment and a geometry symmetrically disposed about the longitudinal optical axis 40 which contains the longitudinal plasma arc 10 to enhance the photo-emission of secondary electrons within photocathode reflector 4. In addition to the production of photo-electrons from the photocathode reflector 4, energetic secondary electrons are also produced from the photocathode reflector 4 by the bombardment of ions and excited states accelerated in the cathode dark space to form the transverse glow discharge electron beam 11. The photocathode reflector 4 is negatively biased by a controlled power source 9 to accelerate the secondary electrons created at the photocathode reflector surface to create the transverse glow discharge electron beam 11. High optical reflector mirror 5 and output optical mirror 6 are provided to extract the optimum laser power from a given excited gas plasma. Although a single photocathode reflector 4 is shown in FIG. 4 for the sake of simplicity, additional suitably biased photocathode reflectors may be added in series along the longitudinal plasma arc 10 portion of longitudinal optical axis 40 to increase the laser power output.

Figure 5:
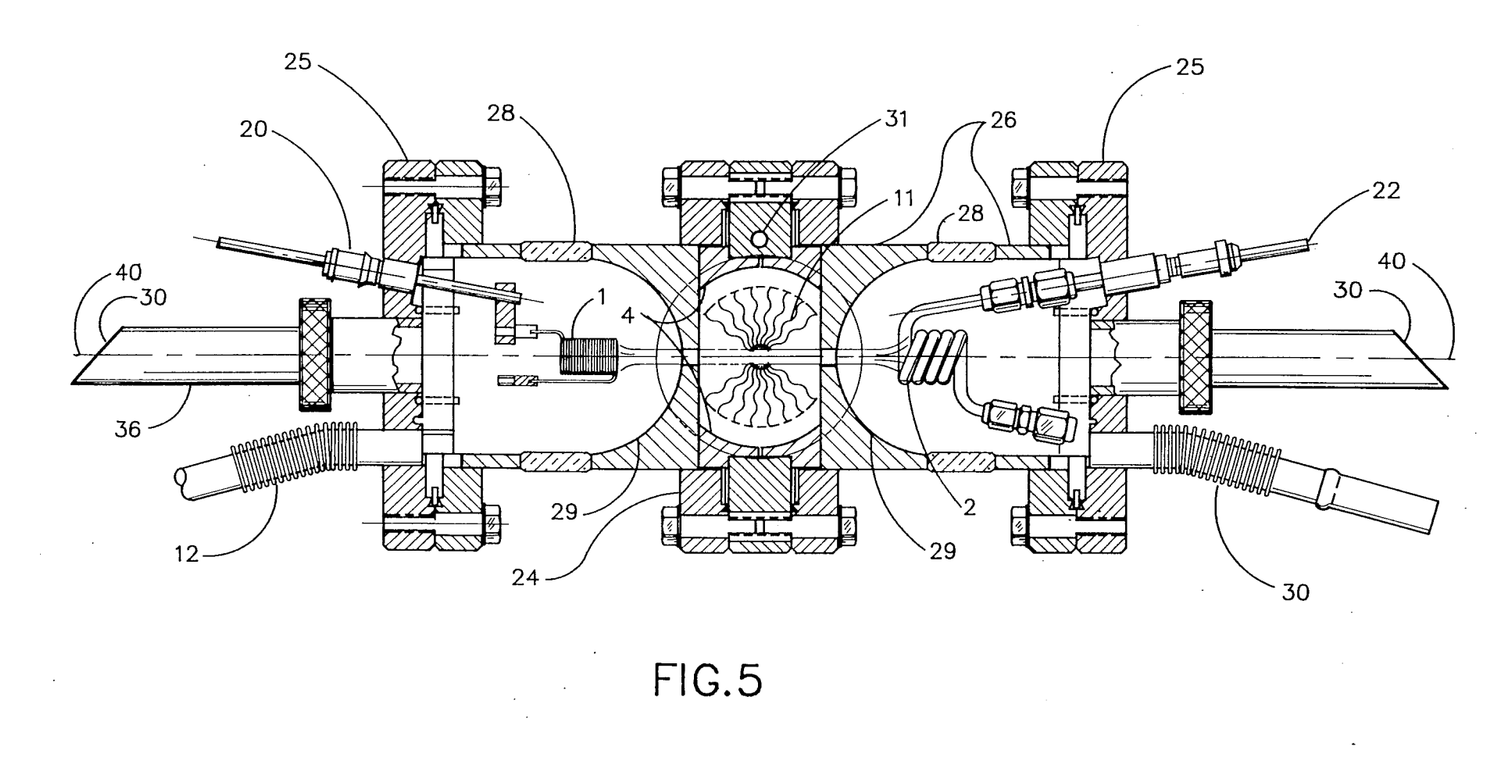
FIG. 5 is a detailed cross-sectional diagram of the gas ion laser of FIG. 4 illustrating the essential structural elements and their relative positions with respect to each other.

Referring now to FIG. 5, there is shown in cross section a more detailed representation of the gas ion laser of FIG. 4. This representation employs a neutral longitudinal plasma arc 10 crossed with a glow discharge electron beam 11 created in the photocathode reflector 4 discussed above in connection with FIG. 4. The essential elements are similar in function to those already described in the simplified exploded view diagram of FIG. 4. Specifically, a thermionic cathode 1 is connected to the power source 7 of FIG. 4 by hermetically sealed electrical feed-throughs 20, only one of which is illustrated. A water-cooled anode electron collector 2 is connected to controlled power source 8 of FIG. 4 by hermetically sealed hollow electrical feed-throughs 22, only one of which is illustrated. The photocathode reflector 4 has a specially shaped line source geometry to transversely pump the longitudinal plasma arc 10. Photocathode reflector 4 preferably has its internal cathode surface treated for high photo-emission and preferably is heat-sinked to fixture 24 having coolant holes 31 therein. The hermetic structural housing 26 is electrically insulated via glass-to-metal seals 28 from end plates 25. Optical end tubes 36 each have a hermetically sealed optical end termination window 30. End termination windows 30 are positioned at Brewster's angle for minimum optical loss. Plasma defining aperature 3 is constructed of heat resisting fused silica or ceramic. Finally, ports 12 are provided for evacuation and gas filling purposes.

Photocathode reflector 4 has an inner surface geometry ranging from a coaxial cylindrical geometry for line focus of the transverse glow discharge electron beam 11 on longitudinal optical axis 40 coincident with longitudinal plasma arc 10, to spherical geometry for point focus on that axis, to intermediate curvatures such as an ellipse or a parabola for selected optimum gas volume excitation. The diameter of the photocathode reflector 4 will typically be ten times the diameter of the longitudinal plasma arc 10 of Figure 4.

In operating the gas ion laser described above, the following procedure is employed. The laser structure is cleaned and evacuated at temperatures permissible by the component stability to a sustained partial pressure of $10_{-7}$ Torr or better. The structure is then back filled with a laser grade gas, such as pure argon, to a partial pressure in the range of 0.1 to 5 Torr. The thermionic cathode 1 of FIGS. 4 and 5 is then heated to the proper emission temperature, as determined by an optical pyrometer, with a controllable high current source 7. The high current discharge between the thermionic cathode 1 and the water cooled anode electron collector 2 is initiated with a transient starting voltage and sustained by a controllable current source 8 ranging from 5 to 50 amperes. Current source 8 may be either an A.C. source or a D.C source. If the discharge shows signs of impurities indicated by the excitation of molecular bands (water vapor, etc.) the pump and fill process is repeated.

When a clean discharge is obtained the electrical bias supply 9 for photocathode reflector 4 is adjusted to excite the laser gas along the longitudinal optical axis 40 which is coincident with the line or point focus of the glow discharge electron beam 11 created in the photocathode reflector 4. The level of excitation may be ascertained by monitoring optical emission from selected energy levels with a monochromator-photometer. Laser action is observed when the proper alignment of mirrors 5 and 6 on the longitudinal optical axis 40 is completed so that the optical gain exceeds the loss. Maximum efficiency will be obtained by adjusting the following variables: (1) laser gas partial pressure; (2) on-axis longitudinal plasma arc current and voltage; (3) transverse glow discharge electron beam power created by the photocathode reflector as well as voltage and current; (4) optical reflectivity of the output mirror; (5) proper surface treatment of the photocathode reflector to enhance the production of secondary electrons.

We claim:

1. A dual beam gas ion laser comprising:
   a vacuum enclosure having a longitudinal optical axis that is defined by a resonant cavity having a mirror at each end thereof, one or both of which is employed to extract power from the laser;
   a thermionic cathode having an axial opening therein and being positioned within the vacuum enclosure such that its axial opening is coaxial with the longitudinal optical axis of the vacuum enclosure for allowing an unobstructed optical path between the two mirrors;
   an anode having an axial opening therein and being positioned within the vacuum enclosure in spaced apart relationship to the thermionic cathode and such that its axial opening is coaxial with the longitudinal optical axis of the vacuum enclosure for allowing an unobstructed optical path between the two mirrors;
   at least two plasma defining aperature means, each having an aperature therein and each being positioned within the vacuum enclosure such that its aperature is in alignment with the longitudinal optical axis of the vacuum enclosure, one of said plasma defining aperature means being positioned proximate to the thermionic cathode and the other of said plasma defining aperature means being positioned proximate to the anode such that both of said plasma defining aperature means are positioned between the thermionic cathode and the anode;
   a photocathode reflector having an axial opening therein and having a geometric inner surface, the photocathode reflector being positioned within the vacuum enclosure between the aperatures in the plasma defining aperature means such that its axial opening is coaxial with the longitudinal optical axis of the vacuum enclosure and such that the geometric focus of the geometric inner surface of the photocathode reflector lies substantially on the longitudinal optical axis of the vacuum enclosure;
   first power supply means electrically connected for heating the thermionic cathode to produce thermionic emission of electrons therefrom;
   second power supply means electrically connected between the thermionic cathode and the anode for accelerating the electrons thermionically emitted by the thermionic cathode to form a longitudinal plasma arc along a portion of the longitudinal optical axis between the anode and the thermionic cathode, the longitudinal plasma arc being generally in alignment with the aperatures of the plasma defining aperature means;
   third power supply means electrically connected to the photocathode reflector to accelerate electrons produced by a combination of photon and ion bombardment of the geometric inner surface of the photocathode reflector to form a glow discharge electron beam that is transverse to said longitudinal plasma arc; and
   gas port means in the vacuum enclosure for permitting evacuation of the vacuum enclosure and for admitting one or more gases into the vacuum enclosure.

2. A dual beam gas ion laser comprising:
   a vacuum enclosure having a longitudinal optical axis that is defined by a resonant cavity having a mirror at each end thereof, one or both of which is employed to extract power from the laser;
   a thermionic cathode having an axial opening therein and being positioned within the vacuum enclosure such that its axial opening is coaxial with the longitudinal optical axis of the vacuum enclosure for allowing an unobstructed optical path between the two mirrors;
   an anode having an axial opening therein and being positioned within the vacuum enclosure in spaced apart relationship to the thermionic cathode and such that its axial opening is coaxial with the longitudinal optical axis of the vacuum enclosure for allowing an unobstructed optical path between the two mirrors;
   at least two plasma defining aperature means, each having an aperature therein and each being positioned within the vacuum enclosure such that its aperature is in alignment with the longitudinal optical axis of the vacuum enclosure, one of said plasma defining aperature means being positioned proximate to the thermionic cathode and the other of said plasma defining aperature means being positioned proximate to the anode such that both of said plasma defining aperature means are positioned between the thermionic cathode and the anode;
   a photocathode reflector comprising two or more sections having substantially symmetrical geometric inner surfaces and having an axial opening therein, said two or more sections being positioned within the vacuum enclosure between the aperatures in the plasma defining aperature means such that the axial opening therein is coaxial with the longitudinal optical axis of the vacuum enclosure and such that the geometric focus of each of the geometric inner surfaces of said two or more sections lies substantially on the longitudinal optical axis of the vacuum enclosure;
   first power supply means electrically connected for heating the thermionic cathode to produce thermionic emission of electrons therefrom;
   second power supply means electrically connected between the thermionic cathode and the anode for accelerating the electrons thermionically emitted by the thermionic cathode to form a longitudinal plasma arc along a portion of the longitudinal optical axis between the anode and the thermionic cathode, the longitudinal plasma arc being generally in alignment with the aperatures of the plasma defining aperature means;

third power supply means electrically connected to the photocathode reflector to accelerate electrons produced by a combination of photon and ion bombardment of the geometric inner surfaces of the two or more sections of the photocathode reflector to form a glow discharge electron beam that is transverse to said longitudinal plasma arc; and gas port means in the vacuum enclosure for permitting evacuation of the vacuum enclosure and for admitting one or more gases into the vacuum enclosure.

3. A dual beam gas ion laser as in claim 1 wherein the photocathode reflector has a cylindrical inner surface.

4. A dual beam gas ion laser as in claim 1 wherein the photocathode reflector has a spherical inner surface.

5. A dual beam gas ion laser as in claim 2 wherein the inner surface of each of the two or more sections of said photocathode reflector is a section of a cylinder.

6. A dual beam gas ion laser as in claim 2 wherein the inner surface of each of the two or more sections of said photocathode reflector is a section of a sphere.

7. A dual beam gas ion laser as in claim 1 wherein the geometric inner surface of said photocathode reflector comprises a material selected for maximum photo-emission of electrons therefrom.

8. A dual beam gas ion laser as in claim 2 wherein the geometric inner surface of each of the two or more sections of said photocathode reflector comprises a material selected for maximum photo-emission of electrons therefrom.

9. A dual beam gas ion laser as in claim 1 wherein the geometric inner surface of said photocathode reflector is selected to maximize an interaction region between the longitudinal plasma arc, the glow discharge electron beam transverse thereto, and the longitudinal optical axis of the vacuum enclosure.

10. A dual beam gas ion laser as in claim 2 wherein said photocathode reflector comprises two cylindrical sections of 90 degrees each.

11. A dual beam gas ion laser as in claim 1 wherein the geometric inner surface of said photocathode reflector comprises a material selected for maximum photoelectron emission therefrom by short wavelength photon radiation from the longitudinal plasma arc.

12. A dual beam gas ion laser as in claim 2 wherein the geometric inner surface of each of the two or more sections of said photocathode reflector comprises a material selected for maximum photo-electron emission therefrom by short wavelength photon radiation from the longitudinal plasma arc.

13. A dual beam gas ion laser as in claim 11 wherein said material comprises metallic tungsten alloyed with cobalt and thorium.

14. A dual beam gas ion laser as in claim 12 wherein said material comprises metallic tungsten alloyed with cobalt and thorium.

15. A dual beam gas ion laser as in claim 11 wherein said material comprises metallic tungsten alloyed with cobalt.

16. A dual beam gas ion laser as in claim 12 wherein said material comprises metallic tungsten alloyed with cobalt.

17. A dual beam gas ion laser as in claim 11 wherein said material comprises metallic tungsten alloyed with thorium.

18. A dual beam gas ion laser as in claim 12 wherein said material comprises metallic tungsten alloyed with thorium.

19. A dual beam gas ion laser as in claim 11 wherein said material comprises metallic tungsten alloyed with oxides of calcium, strontium, and aluminum.

20. A dual beam gas ion laser as in claim 12 wherein said material comprises metallic tungsten alloyed with oxides of calcium, strontium, and aluminum.

21. A dual beam gas ion laser as in claim 1 wherein said photocathode reflector is maintained at a temperature selected for maximum total electron emission therefrom.

22. A dual beam gas ion laser as in claim 2 wherein said photocathode reflector is maintained at a temperature selected for maximum total electron emission therefrom.

23. A dual beam gas ion laser as in claim 1 further comprising one or more additional photocathode reflectors positioned along the portion of the longitudinal optical axis of the vacuum enclosure at which the longitudinal plasma arc is formed to increase the laser power output.

24. A dual beam gas ion laser as in claim 2 further comprising one or more additional photocathode reflectors positioned along the portion of the longitudinal optical axis of the vacuum enclosure at which the longitudinal plasma arc is formed to increase the laser power output.

25. A dual beam gas ion laser comprising:

a vacuum enclosure having a longitudinal optical axis that is defined by a resonant cavity having a mirror at each end thereof, one or both of which is employed to extract power from the laser;

a first thermionic emitter element having an axial opening therein and being positioned within the vacuum enclosure such that its axial opening is coaxial with the longitudinal optical axis of the vacuum enclosure for allowing an unobstructed optical path between the two mirrors;

a second thermionic emitter element having an axial opening therein and being positioned within the vacuum enclosure in spaced apart relationship to the first thermionic element and such that its axial opening is coaxial with the longitudinal optical axis of the vacuum enclosure for allowing an unobstructed optical path between the two mirrors;

at least two plasma definging aperature means, each having an aperature therein and each being positioned within the vacuum enclosure such that its aperature is in alignment with the longitudinal optical axis of the vacuum enclosure, one of said plasma defining aperature means being positioned proximate to the first thermionic emitter element and the other of said plasma defining aperature means being positioned proximate to the second thermionic emitter element such that both of said plasma defining aperature means are positioned between the first and second thermionic emitter elements;

a photocathode reflector having an axial opening therein and having a geometric inner surface, the photocathode reflector being positioned within the vacuum enclosure between the aperatures in the plasma defining aperature means such that its axial opening is coaxial with the longitudinal optical axis of the vacuum enclosure and such that the geometric focus of the geometric inner surface of the photocathode reflector lies substantially on the longitudinal optical axis of the vacuum enclosure;

first power supply means electrically connected for heating the first thermionic emitter element to produce thermionic emission of electrons therefrom;

second power supply means electrically connected for heating the second thermionic emitter element to produce thermionic emission of electrons therefrom;

third power supply means electrically connected between the first and second thermionic emitter elements for accelerating the electrons thermionically emitted by the first and second thermionic emitter elements to form a longitudinal plasma arc along a portion of the longitudinal optical axis between the first and second thermionic emitter elements, the longitudinal plasma arc being generally in alignment with the aperatures of the plasma defining aperature means;

fourth power supply means electrically connected to the photocathode reflector to accelerate electrons produced by a combination of photon and ion bombardment of the inner surface of the photocathode reflector to form a glow discharge electron beam that is transverse to said longitudinal plasma arc; and gas port means in the vacuum enclosure for permitting evacuation of the vacuum enclosure and for admitting one or more gases into the vacuum enclosure.

26. A dual beam gas ion laser comprising:

a vacuum enclosure having a longitudinal optical axis that is defined by a resonant cavity having a mirror at each end thereof, one or both of which is employed to extract power from the laser;

a first thermionic emitter element having an axial opening therein and being positioned within the vacuum enclosure such that its axial opening is coaxial with the longitudinal optical axis of the vacuum enclosure for allowing an unobstructed optical path between the two mirrors;

a second thermionic emitter element having an axial opening therein and being positioned within the vacuum enclosure in spaced apart relationship to the first thermionic element and such that its axial opening is coaxial with the longitudinal optical axis of the vacuum enclosure for allowing an unobstructed optical path between the two mirrors;

at least two plasma defingïng aperature means, each having an aperature therein and each being positioned within the vacuum enclosure such that its aperature is in alignment with the longitudinal optical axis of the vacuum enclosure, one of said plasma defining aperature means being positioned proximate to the first thermionic emitter element and the other of said plasma defining aperature means being positioned proximate to the second thermionic emitter element such that both of said plasma defining aperature means are positioned between the first and second thermionic emitter elements;

a photocathode reflector comprising two or more sections having substanially symmetrical geometric inner surfaces and having an axial opening therein, said two or more sections being positioned within the vacuum enclosure between the aperatures in the plasma defining aperature means such that the axial opening therein is coaxial with the longitudinal optical axis of the vacuum enclosure and such that the geometric focus of the geometric inner surfaces of said two or more sections lies substantially on the longitudinal optical axis of the vacuum enclosure;

first power supply means electrically connected for heating the first thermionic emitter element to produce thermionic emission of electrons therefrom;

second power supply means electrically connected for heating the second thermionic emitter element to produce thermionic emission of electrons therefrom;

third power supply means electrically connected between the first and second thermionic emitter elements for accelerating the electrons thermionically emitted by the first and second thermionic emitter elements to form a longitudinal plasma arc along a portion of the longitudinal optical axis between the first and second thermionic emitter elements, the longitudinal plasma arc being generally in alignment with the aperatures of the plasma defining aperature means;

fourth power supply means electrically connected to the photocathode reflector to accelerate electrons produced by a combination of photon and ion bombardment of the geometric inner surfaces of the two or more sections of the photocathode reflector to form a glow discharge electron beam that is transverse to said longitudinal plasma arc; and gas port means in the vacuum enclosure for permitting evacuation of the vacuum enclosure and for admitting one or more gases into the vacuum enclosure.

27. A dual beam gas ion laser as in claim 25 wherein said first, second, and third power supply means comprise A.C. power supplies.

28. A dual beam gas ion laser as in claim 26 wherein said first, second, and third power supply means comprise A.C. power supplies.

29. A dual beam gas ion laser as in claim 1 wherein:
said vacuum enclosure is maintained at an elevated temperature; and
said vacuum enclosure includes an extension containing a quantity of a metal to be made gaseous, said extension being maintained at a temperature lower than that of said vacuum enclosure.

30. A dual beam gas ion laser as in claim 2 wherein:
said vacuum enclosure is maintained at an elevated temperature; and
said vacuum enclosure includes an extension containing a quantity of a metal to be made gaseous, said extension being maintained at a temperature lower than that of said vacuum enclosure.

31. A dual beam gas ion laser as in claim 1 wherein said gas port means is operative for admitting two or more gases, one of which is a rare gas, into the vacuum enclosure, and for controlling the partial pressures of the two or more gases so admitted.

32. A dual beam gas ion laser as in claim 2 wherein said gas port means is operative for admitting two or more gases, one of which is a rare gas, into the vacuum enclosure, and for controlling the partial pressures of the two or more gases so admitted.

33. A dual beam gas ion laser as in claim 1 wherein said fourth power supply means produces a time-varying voltage for controlling the glow discharge electron beam that is transverse to said longitudinal plasma arc.

34. A dual beam gas ion laser as in claim 2 wherein said fourth power supply means produces a time-varying voltage for controlling the glow discharge electron beam that is transverse to said longitudinal plasma arc.

35. A dual beam gas ion laser as in claim 1 wherein said gas port means is operative for admitting two noble gases into the vacuum enclosure and for controlling the partial pressures of the two noble gases so admitted.

36. A dual beam gas ion laser as in claim 2 wherein said gas port means is operative for admitting two noble gases into the vacuum enclosure and for controlling the partial pressures of the two noble gases so admitted.

37. A dual beam gas ion laser as in claim 35 wherein the two noble gases comprise helium and argon.

38. A dual beam gas ion laser as in claim 36 wherein the two noble gases comprise helium and argon.

39. A dual beam gas ion laser as in claim 35 wherein the two noble gases comprise helium and krypton.

40. A dual beam gas ion laser as in claim 36 wherein the two noble gases comprise helium and krypton.

* * * * *